(12) United States Patent
Grafi et al.

(10) Patent No.: US 11,816,213 B2
(45) Date of Patent: Nov. 14, 2023

(54) SYSTEM AND METHOD FOR IMPROVED PROTECTION AGAINST MALICIOUS CODE ELEMENTS

(71) Applicant: Votiro Cybersec Ltd., Tel Aviv (IL)

(72) Inventors: Aviv Grafi, Ramat Gan (IL); Yehuda Neeman, Petach Tikva (IL)

(73) Assignee: VOTIRO CYBERSEC LTD., Tel-Aviv (IL)

( * ) Notice: Subject to any disclaimer, the term of this patent is extended or adjusted under 35 U.S.C. 154(b) by 319 days.

(21) Appl. No.: 17/115,602

(22) Filed: Dec. 8, 2020

(65) Prior Publication Data
US 2021/0173928 A1 Jun. 10, 2021

Related U.S. Application Data

(60) Provisional application No. 62/945,315, filed on Dec. 9, 2019.

(51) Int. Cl.
*G06F 21/56* (2013.01)
*G06F 21/44* (2013.01)

(52) U.S. Cl.
CPC ............ *G06F 21/563* (2013.01); *G06F 21/44* (2013.01); *G06F 21/565* (2013.01); *G06F 2221/033* (2013.01)

(58) Field of Classification Search
CPC ...... G06F 21/563; G06F 21/44; G06F 21/565; G06F 2221/033; G06F 21/56
See application file for complete search history.

(56) References Cited

U.S. PATENT DOCUMENTS

| | | | | |
|---|---|---|---|---|
| 10,275,596 | B1* | 4/2019 | Gupta | G06F 21/566 |
| 10,860,715 | B2* | 12/2020 | Shi | G06F 21/563 |
| 11,184,379 | B1* | 11/2021 | Kjar | G06F 21/565 |
| 2005/0240781 | A1* | 10/2005 | Gassoway | H04L 63/145 |
| | | | | 713/188 |
| 2006/0150256 | A1* | 7/2006 | Fanton | G06F 21/51 |
| | | | | 726/27 |
| 2010/0024033 | A1* | 1/2010 | Kang | H04L 63/1466 |
| | | | | 726/23 |
| 2019/0347412 | A1* | 11/2019 | Finlayson | G06F 21/51 |

(Continued)

OTHER PUBLICATIONS

Grimes, Roger A., "Malicious Mobile Code," www.oreilly.com/library/view/malicious-mobile-code/156592682X/ch01s02.html, downloaded Sep. 24, 2020) (15 pgs.).

(Continued)

*Primary Examiner* — Jayesh M Jhaveri
(74) *Attorney, Agent, or Firm* — Finnegan, Henderson, Farabow, Garrett & Dunner, LLP (57) ABSTRACT

Method and system for protecting an executing environment from malicious code elements, one exemplary method including compiling a set of trustworthy code elements, each code element being executable using an application. The method further includes determining whether the file contains an embedded code element. If the file contains an embedded element, the embedded code element can be authenticated based on the stored set of code elements, to determine whether the embedded code element is trustworthy. Access to the file can be enabled in response to an authentication result that the embedded code element is trustworthy.

20 Claims, 7 Drawing Sheets

(56) References Cited

U.S. PATENT DOCUMENTS

2020/0349257 A1* 11/2020 Saffar .................. G06F 21/564

OTHER PUBLICATIONS

"Malicious Code Protection Guidance," Nuclear Regulatory Commission, Computer Security Office, Computer Security Guidance, Adams Accession No. ML13107A777 (2013) (16 pgs.).
"Word Macros: The Risk," MakeOfficeWork.com, https://makeofficework.com/word_macros_the_risk.htm (downloaded on Sep. 24, 2020) (2 pgs.).
Zeltser, Lenny, "Analyzing Malicious Documents," Sans Dfir Digital Forensics & Incident Response https://digital-forensics.sans.org/media/analyzing-malicious-document-files.pdf (downloaded Sep. 11, 2020) (1 pg.).

* cited by examiner

SYSTEM AND METHOD FOR IMPROVED PROTECTION AGAINST MALICIOUS CODE ELEMENTS

This disclosure claims priority under 35 U.S.C. § 119 to U.S. provisional patent application no. 62/945,315, filed on Dec. 9, 2019, the content of which is incorporated herein by reference in its entirety.

TECHNICAL FIELD

The present disclosure relates to the field of computer security and, more particularly, to systems and methods of improving security protection against malicious code elements.

BACKGROUND

Attackers can use active content embedded in a document, file, e-mail or other communications to execute malicious code or enable other malicious activity on a victim's computer. Active content may include any content embedded in an electronic file or document or e-mail and configured to carry out an action or trigger an action. Common forms of active content include word processing and spreadsheet macros, formulas, or scripts, JavaScript code within Portable Document Format (PDF) documents, web pages including plugins, applets or other executable content, browser or application toolbars and extensions, etc. Some malicious active content can be automatically invoked to perform the intended malicious functions when a computer runs a program or application to render (e.g., open, read, or otherwise allow user interaction) the received content, such as a file or document. One such example includes the use of a macro embedded in a spreadsheet, where the macro is configured to be automatically executed to take control of the victimized computer upon the user opening the spreadsheet, without any additional action by the user. Active content used by hackers may also be invoked in response to some other action taken by a user or computer process. The present disclosure is directed to solving problems rooted in the use of embedded active content generally, without regard to how the active content is invoked and executed.

Techniques have been implemented to mitigate the risks posed by malicious active content embedded in electronic documents. One common data sanitization or content disarm and reconstruction (CDR) technique includes removing any detected forms of malicious active content from a document or other received content before it is passed to an intended recipient or otherwise rendered. Similarly, instead of removing such active content, some known techniques change the active content in a way that deactivates it or renders it useless.

Other techniques include application-based solutions that include user-configurable settings or default settings within a rendering application that control how or whether malicious active content in a document may be disarmed or otherwise prevented from executing. These solutions, however, may be difficult to configure and manage for an enterprise including many users, and moreover, also suffer from difficulties similar to those described above in that some active content may be beneficial to the end user such that it is undesirable to categorically block all active content from execution. These solutions may also require cumbersome steps on the part of the user to override the default settings or otherwise enable the active content in order to reap the benefits of legitimate active content, an inconvenience that is not a satisfactory solution.

Other application-based solutions are known to temporarily prevent the execution of any active content that may be embedded in a document. For example, Microsoft® includes a "protected view" feature in Word documents that enables a user to open a document in a protected environment, such as a "sandbox," to view only the passive content while macros and any other active content are disabled or prevented from executing. The "protected view" environment has limitations in that a user is unable to edit or fully access content of the document unless he exits the protected environment. If the user chooses to do so, however, the user may be exposed to malicious active content.

While these techniques may be successful to prevent malicious functions resulting from execution of the active content, some enterprises or applications may rely heavily on the useful functionalities that are intended by non-malicious active content embedded in digital files. For example, for some enterprises, spreadsheet application macros can provide significant productivity benefits that should not be indiscriminately discarded. The wholesale removal or destruction of any and all active content from received documents therefore negatively affects productivity.

Thus, there is a need for improved techniques to mitigate the risks posed by malicious active content without compromising the usability of non-malicious active content, and to overcome at least some of the above disadvantages of known techniques.

SUMMARY

According to some embodiments, methods of protecting an execution environment from malicious code elements are provided. According to one exemplary method, a set of code elements can be compiled, each code element being executable using an application. After the system receives a file, it can be determined whether the file contains an embedded code element. If the file contains an embedded element, the embedded code element can be extracted and authenticated based on the stored set of code elements, to determine whether the embedded code element is trustworthy. Access to the file can be enabled in response to an authentication result that the embedded code element is trustworthy.

According to some embodiments, non-transitory computer-readable medium comprising instructions are provided. The instructions can be executed by a processor perform a method of protecting an execution environment from malicious code elements. The method includes storing a set of code elements, each code element being executable using an application. The processor can further execute the instructions to receive a file, and determine whether the file contains an embedded code element. In response to the file containing an embedded code element, the processor can further execute the instructions to authenticate the embedded code element based on the stored set of code elements to determine whether the embedded code element is trustworthy. In response to an authentication result that the embedded code element is trustworthy, the processor can further execute the instructions to enable access to the file.

According to some embodiments, systems for protecting an execution environment from malicious code elements are provided. One exemplary system comprises a memory device storing a set of instructions, and a processor configured to execute the set of instructions to perform a method of protecting an execution environment from malicious code elements. The system can store a set of code elements, each code element being executable using an application. The system can further receive a file and determine whether the file contains an embedded code element. In response to the file containing an embedded code element, the system can authenticate the embedded code element based on the stored set of code elements to determine whether the embedded code element is trustworthy. If the system determines that the embedded code element is trustworthy, the system can enable access to the file.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Reference will now be made in detail to example embodiments implemented according to the present disclosure, the examples of which are illustrated in the accompanying drawings. Wherever possible, the same reference numbers will be used throughout the drawings to refer to the same or like parts. In the following description, numerous specific details are set forth in order to provide a thorough understanding of the disclosed example embodiments. However, it will be understood by those skilled in the art that the principles of the example embodiments may be practiced without every specific detail. Well-known methods, procedures, and components may not be described in detail so as not to obscure the principles of the example embodiments. Unless explicitly stated, the example methods and processes described herein are not constrained to a particular order or sequence. Additionally, some of the described embodiments or elements thereof can occur or be performed simultaneously.

One technique hackers use to obtain control of a victim computer or computing environment is through the execution of malicious code at the victim computer or computing environment using malicious code elements embedded in electronic files. Hackers may configure the malicious code elements to be automatically invoked when a document is rendered and executed automatically upon rendering the document, such as upon opening of a document, workbook, sheet, etc. Other types of malicious code elements may be executed after rendering based on user interaction with the document.

However, many electronic documents contain non-malicious embedded code elements that provide various functionalities for improving productivity. One common example is macros that can be embedded in documents such as Word, PDF, PowerPoint, or Excel files. For example, Microsoft® Office provide coding tools, such as Visual Basic for Applications (VBA) editor, which allow a user to program macros to record a series of commands and actions. Macros can represent a series of keystrokes, mouse movements, commands, or other types of input or operations. Macros may be stored as function modules and embedded in a file. By activating the macros, the corresponding recorded commands and actions can be automatically executed without additional user operations or programming. Macros can further be copied and embedded in other files to automate similar tasks. Enterprises may design and use macros or other embedded code elements to improve efficiency and productivity in processing electronic files.

Both malicious code elements and non-malicious code elements may exist in similar formats or programmed and embedded in similar manners. Computer security mechanisms, such as virus or malware programs, may block or disable both malicious code elements and non-malicious code elements as targeted active content. Active content is distinct from other "passive content" that is rendered by the application to form the document itself. As used herein, active content refers to any content embedded in a document that is configured to carry out an action or trigger an action, common forms of which include word processing and spreadsheet macros, routines, formulas, or scripts, etc., including JavaScript code embedded in PDF documents, for example, or any other form of executable script or code. It is appreciated that macros or other code elements can be programmed in different programming languages, such as Vim, C programming language, VBA, HTML, CSS, JavaScript, Python, Java, Ruby, and others. Execution of active content may be invoked automatically upon rendering, or by selection of a document feature, such as a button, icon, or link, or upon input of a particular keystroke. Any active content can be disabled or disarmed, so that the intended functions are not carried out.

Active content embedded in a file may include both malicious code elements and non-malicious code elements. Disabling all active content, although it may provide maximum protection by eliminating any potential risk of malicious content, may negatively affect productivity. For example, a user accessing a file with all active content disabled is forced to code and store function modules that were otherwise provided by the non-malicious coded elements originally embedded in the file. And for users without the capability to navigate coding tools, they are forced to manually input every file processing instruction.

The disclosed embodiments provide solutions for mitigating the risks posed by malicious code elements while preserving the functionalities of non-malicious code elements. For example, some embodiments provide solutions to authenticate code elements embedded in a file, by comparing them against a whitelist of code elements that are considered trustworthy and non-malicious. If a code element embedded in the file matches a code element in the whitelist, the embedded code element is determined to be trustworthy and remains active or accessible. On the other hand, if the embedded code element is not in the whitelist, the embedded code element is determined to be untrustworthy or potentially malicious. The embedded code element can be removed, modified, or otherwise disabled from being executed, before enabling user access to the file. Accordingly, malicious code elements can be disarmed to prevent potential malicious attacks and security risks, while non-malicious code elements are selectively preserved. The disclosed embodiments, therefore, provide improved functionality for mitigating the risks of active content while enhancing convenience and usability of active content that may be beneficial to an enterprise.

The disclosed embodiments may be provided as part of a data sanitization or CDR process for sanitizing or modifying electronic content received at a computer or a computing system. Other CDR techniques that may be implemented together with the disclosed embodiments include, for example, techniques for document reformatting or document layout reconstruction techniques, and techniques for altering digital content.

The disclosed embodiments may be implemented with respect to any and all active content identified in a document, file, or other received or input content that is deemed suspicious and may contain malicious code elements. For example, the disclosed embodiments may apply to received content that comes from or is associated with an untrusted, unknown, or external source. In some embodiments, the code detection and authentication process may be combined with techniques for authenticating a file source. For example, when receiving an input file, a computer security system may authenticate the file source by comparing it with a list of trusted sources. The system may enable access to the file when the file is determined to be associated with a trusted source that is included in the list.

In some embodiments, the code detection and authentication process may be implemented as part of an enterprise's security policies. For example, incoming content intended for any recipient within the enterprise can be first processed to detect and authenticate any embedded code elements, or authenticate the file source, before the enterprise allows delivery of the incoming content to the recipient. In some embodiments, the enterprise may impose different policies, authorizing certain users to enable or disable the code detection and authentication process, or select a more restricted or more expansive whitelist used in the code detection and authentication process. That way, security and productivity levels associated with processing incoming files can be accordingly adjusted as necessary and allow flexibility.

In addition, some embodiments can be combined with additional security mechanisms designed to disarm potential malicious code elements. For example, the code detection and authentication process of some embodiments can be integrated into the security mechanisms as an additional layer by first authenticating embedded code elements based on the whitelist of trustworthy code elements. Code elements determined to be trustworthy can then be precluded from the subsequent disarming process targeting the remaining embedded code elements. It is appreciated that the example embodiments disclosed herein are not limited to any particular enterprise computing environment or implementation, or security mechanisms, and can be implemented as a standalone solution or as part of a suite of solutions, and can be customized according to preferences of a computing environment.

Received content or input content according to the disclosed embodiments may include any form of electronic content, including a file, document, an e-mail, etc., or other objects that may be run, processed, opened or executed by an application or operating system of a recipient computer or other computing device. Active content can be embedded among various forms of seemingly legitimate received content or input content. While some embodiments of the present disclosure refer to an input file or document, it is appreciated that the disclosed techniques are applicable to objects or partitions within a file or to input content generally.

Figure 1:
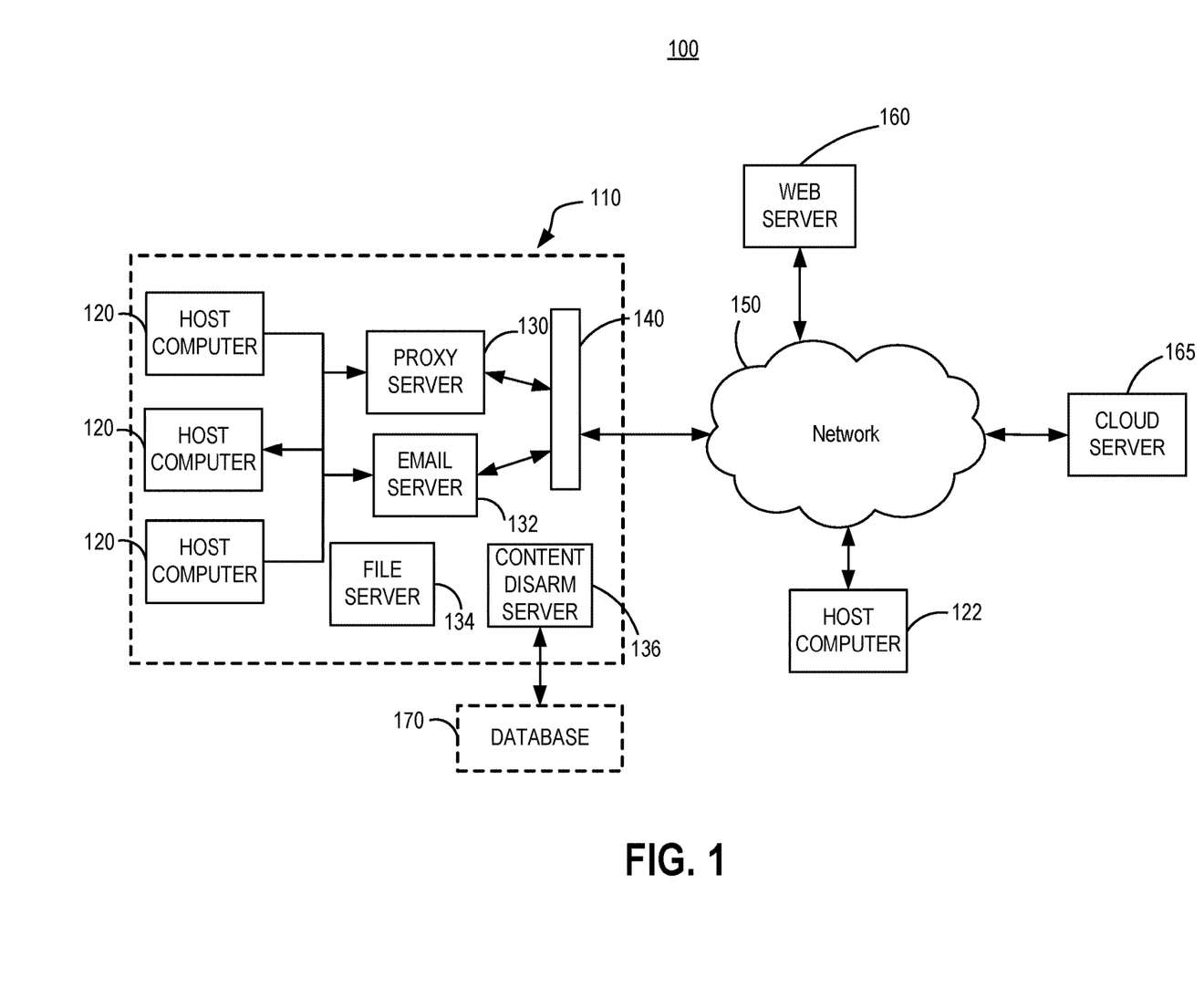
FIG. 1 is a schematic block diagram of an example computing environment, according to some embodiments of the present disclosure.

FIG. 1 is a schematic block diagram of an example computing environment 100, according to some embodiments of the present disclosure. As shown in FIG. 1, an exemplary computing environment 100 includes a plurality of computing systems interconnected via one or more networks. Network 110 may be configured as a private network. Network 110 includes a plurality of host computers 120, a proxy server 130, an e-mail server 132, a file server 134, a content disarm server 136, and a firewall 140. Any of proxy server 130, e-mail server 132, or firewall 140 may be considered an edge network device that interfaces with a second network, such as network 150. Host computers 120 and other computing devices of network 110 may be capable of communicating with a web server 160, a cloud server 165 and other host computers like host computer 122 via one or more additional networks.

Networks 110 and 150 may comprise any type of computer networking arrangement used to exchange data among a plurality of computing components and systems. Network 110 may include a single local area network, or a plurality of distributed interconnected networks and may be associated with an organization. The interconnected computing systems of network 110 may be within a single building or a defined geographical area. Network 110, thus, may include one or more private data networks, a virtual private network using a public network, one or more LANs or WANs, and/or any other suitable combination of one or more types of networks, secured or unsecured.

Network 150 likewise may comprise any type of computer networking arrangement for facilitating communication between devices of network 110 and other distributed computing components such as web server 160, cloud server 165, or host computer 122. Web server 160 and cloud server 165 may include any configuration of one or more servers or server systems interconnected with network 150 for facilitating communications and transmission of content or other data to the plurality of computing systems interconnected via network 150. In some embodiments, cloud server 165 may include any configuration of one or more servers or server systems providing content or other data specifically for the computing components of network 110. Network 150 may include the Internet, a private data network, a virtual private network using a public network, a Wi-Fi network, a LAN or WAN network, and/or other suitable connections that enable information exchange among various components in computing environment 100. Network 150 may also include a public switched telephone network ("PSTN") and/or a wireless cellular network.

Host computers 120 include any type of computing system configured for communicating within network 110 and/or network 150. Host computers 120 may include, for example, a desktop computer, laptop computer, tablet, smartphone and any other network connected device such as a server, server system, printer, as well as other networking components.

File server 134 includes one or more computing components or systems for managing files and other data for network 110. In some embodiments, file server 134 may include a storage area network comprising one or more servers or databases, or other configurations known in the art.

Content disarm server 136 includes one or more dedicated servers or other computing components or systems for performing aspects of the example processes for performing security checks on electronic content. Content disarm server 136 may be provided as part of network 110, as shown, or may be accessible to other computing components of network 110 via network 150. In some embodiments, some or all of the functionality attributed to content disarm server 136 may be performed in a host computer 120 or an associated computer security device. Content disarm server 136 may be in communication with any of the computing components of network 110, and function as an intermediary system to receive input content from proxy server 130, e-mail server 132, file server 134, host computers 120, or firewall 140 and process the received content before delivering to an intended recipient device.

For example, content disarm server 136 may be configured to perform one or more malicious code detection and disarming processes, such as code detection and authentication according to some embodiments disclosed herein, signature-based malware detection algorithms, or behavior-based algorithms or techniques for detecting malicious activity in a "sandbox," for example. In some embodiments, one or more malware detection algorithms may be implemented together with the disclosed techniques to detect any malicious active content included in input content while preserving trustworthy, non-malicious code elements. For example, one or more malware detection algorithms may be implemented to screen input content for known malicious active content, whereby the example embodiments are implemented to authenticate code elements and prevent trustworthy code elements from being disabled.

In some embodiments, content disarm server 136 and/or file server 134 include a dedicated repository for storing input content received by content disarm server 136. The dedicated repository may be restricted from general access by users or computers of network 110, for example, while the stored input content therein is being screened and processed for security. In some embodiments, all or select input content may be stored for a predetermined period of time or according to a policy of a network administrator.

Proxy server 130 includes any type of computing component or system for handling communication requests between one or more interconnected computing devices of network 110. In some embodiments, proxy server 130 may be configured as one or more edge servers positioned between a private network of network 110, for example, and a public network.

E-mail server 132 includes any type of computing component or system for handling electronic mail communications between one or more interconnected computing devices of network 110 and other devices external to network 110. In some embodiments, e-mail server 132 may be configured as one or more edge servers positioned between a private network of network 110, for example, and a public network.

Firewall 140 can be implemented according to any known firewall configuration for controlling communication traffic between network 110 and external networks such as network 150. In some embodiments, firewall 140 may include an edge firewall configured to filter communications entering and leaving network 110. Firewall 140 may be positioned between network 150 and one or more of proxy server 130 and e-mail server 132. In the example shown in FIG. 1, proxy server 130, e-mail server 132 and firewall 140 are positioned within network 110, however, configurations of network 110 may vary in other embodiments. For example, in some embodiments, one or more of proxy server 130, e-mail server 132 and firewall 140 may be provided external to network 110. Any other suitable arrangement is also contemplated. Additionally, other networking components, not shown, may be implemented as part of network 110 or external to network 110 for facilitating communications within network 110 and with other external networks, such as network 150.

As described in greater detail below, the processes of the example embodiments may be implemented at any one of the computing devices or systems shown in FIG. 1, including host computers 120, proxy server 130, e-mail server 132, file server 134, content disarm server 136, firewall 140, or cloud server 165.

Figure 2:
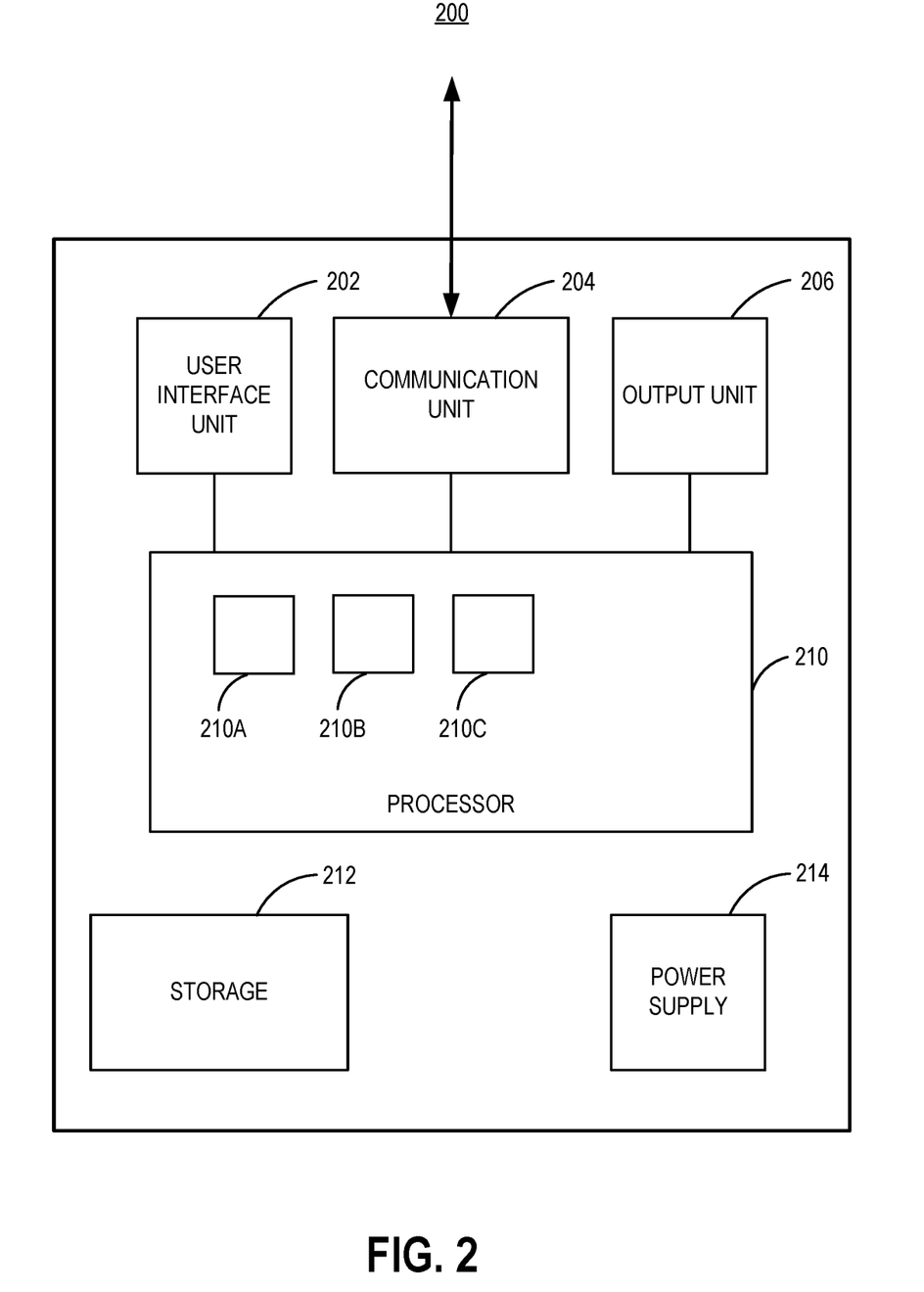
FIG. 2 is a schematic block diagram of an example computing system adapted to perform methods of protecting against malicious code elements, according to some embodiments of the present disclosure.

FIG. 2 is a schematic block diagram of an example computing system 200 adapted to perform methods of protecting against malicious code elements, according to some embodiments of the present disclosure. According to some embodiments, computing system 200 may be embodied in one or more computing components of computing environment 100. For example, computing system 200 may be provided as part of host computers 120, proxy server 130, e-mail server 132, file server 134, content disarm server 136, or cloud server 165. In some embodiments, computing system 200 may not include each element or unit depicted in FIG. 2. Additionally, one of ordinary skill in the art would understand that the elements or units depicted in FIG. 2 are examples only and a computing system according to the example embodiments may include additional or alternative elements than those shown.

As shown in FIG. 2, computing system 200 includes a processor 210, a user interface unit 202, a communication unit 204, an output unit 206, a storage unit 212, and a power supply 214. Processor 210 may be, for example, a central processing unit processor (CPU), a chip or any suitable computing or computational device. Processor 210 may be programmed or otherwise configured to carry out aspects of the disclosed embodiments.

Processor 210 includes a memory unit 210A, which may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory unit 210A may include a plurality of memory units.

Processor 210 further includes executable code 210B which may be any executable code, e.g., an application, a program, a process, task or script. Executable code 210B may be executed under control of an operating system 210C. For example, executable code 210B may be an application that when operating performs one or more aspects of the example embodiments. Executable code 210B may also include one or more applications configured to render input content, so as to open, read, edit, and otherwise interact with the rendered content.

User interface unit 202 may be any interface enabling a user to control, tune, and monitor the operation of computing system 200, including a keyboard, touch screen, pointing device, screen, audio device such as loudspeaker or earphones.

Communication unit 204 may be any communication supporting unit for communicating across a network that enables transmitting and receiving digital and/or analog data, including communicating over wired and/or wireless communication channels according to any known format. Communication unit 204 may include one or more interfaces known in the art for communicating via local (e.g., network 110) or remote networks and or for transmitting or receiving data via an external, connectable storage element or storage medium.

Output unit 206 can be any visual and /or aural output device adapted to present user-perceptible content to a user, such as media content. Output unit 206 may be configured to, for example, display images embodied in image files, play audio embodied in audio files and present and play video embodied in video files. Output unit 206 may include a screen, a projector, or the like, for presenting image and/or video content to a user. Output unit 206 may also include, for example, a loudspeaker, earphone, or other audio playing devices adapted to present audio content to a user.

Storage unit 212 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Data or content, including user-perceptible content may be stored in storage unit 212 and loaded from storage unit 212 into memory unit 210A for processing by processor 210.

Power supply 214 may include one or more conventional elements for providing power to computing system 200 including an internal battery or unit for receiving power from an external power supply, as is understood by one of ordinary skill in the art.

Figure 3:
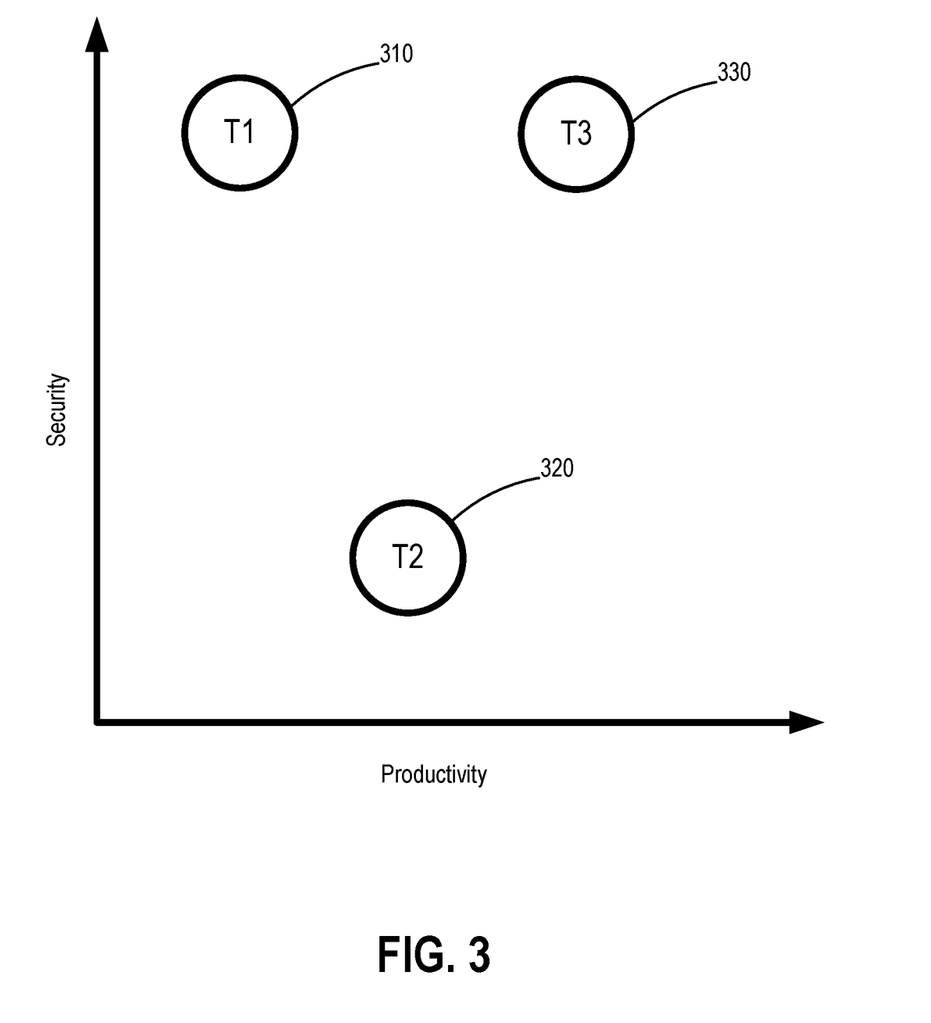
FIG. 3 is a schematic illustration of different models of malicious code protection mechanisms, according to some embodiments of the present disclosure.

FIG. 3 is a schematic illustration of different models of malicious code protection mechanisms, according to some embodiments of the present disclosure. As shown in FIG. 3, different models represent corresponding tradeoffs between security and productivity. As shown, model 310 represents Type 1 malicious code protection systems with the highest security level at a low level of productivity. For example, Type 1 systems may include systems that remove all code elements embedded in the input content and leave only passive content. Such systems may convert input files into a different format with all active content (including potentially malicious code elements and non-malicious code elements) disabled from execution. The systems can then allow users to access the converted or modified files, to ensure a high level of security. This, however, typically means that the modified files no longer include function modules that could otherwise be allowed and are therefore less useful. Productivity in file processing and associated tasks is therefore compromised.

As an example, if the system receives an input Word document with embedded macros, a Type 1 security system may convert the Word documents into a PDF file and remove all underlying code elements corresponding to the macros. After the conversion, the system can forward the modified PDF file to an intended recipient or enable access to the modified file. Alternatively, the system may, after removing the embedded code elements, create a modified file that presents in a Word format. That way, the user can still access the passive content of the document with Word editing functionalities. One disadvantage of such a system is the loss of functionalities and information provided by the macros included in the original file. Impact on productivity can be significant, as indicated by the low level of productivity in FIG. 3.

Model 320 represents Type 2 malicious code protection systems where input content is stripped of some active content with the purpose of removing potentially malicious code elements, but some active content is left intact to maintain productivity. For example, such systems can include antivirus programs targeting only certain known or defined categories of malware, or they may implement security scrutiny only for critical system areas. Such systems can also include security programs that target only incoming files from certain external sources, such as blacklisted servers, domains, or IP addresses. The files, compared to the implementation of Type 1 systems, are subject to little or minimal modification. When a user accesses the modified file, some or all of the functionalities enabled by active content embedded therein may remain largely intact. The modification made by the security system may not be noticeable. For example, in cases where images are used as carriers of malicious code elements, with Type 2 systems, the images may only be slighted altered during the security or malware scanning process, but the ultimately rendered image may be substantially the same, with no noticeable visual difference to a viewer.

As noted above, compared to Type 1 systems, Type 2 systems may cause less or little effect on the usage or functionalities of the original input content. Type 2 systems may be tailored to offer different levels of security and corresponding levels of productivity. It is appreciated that some Type 2 systems may involve more file modification for higher levels of security, compared to other Type 2 systems. For example, in some Type 2 systems, macros embedded in Word or Excel documents may be considered untrustworthy and categorically removed or disabled. In other Type 2 systems, macros included in certain input files may be excluded from the security processing and left intact in the files.

Model 330 as shown in FIG. 3 represents Type 3 malicious code protection systems consistent with embodiments of the present disclosure. In Type 3 malicious code protection systems, a high level of security can be achieved while maintaining a higher level of productivity at the same time. In some embodiments, Type 3 systems can be implemented to remove potential malicious code elements while keeping non-malicious or trustworthy code elements in place. For example, a Type 3 system may be configured to detect and authenticate active content included in the input content. The active content may include malicious code-elements and non-malicious code elements. The authentication process can be based on a whitelist of trustworthy code elements. If an embedded code element extracted from an input file matches a trustworthy code element included in the whitelist, the code element can be determined to be trustworthy. If an embedded code element extracted from the input file does not match code elements in the whitelist, the embedded code element can be considered potentially malicious and subject to removal or further processing.

For code elements that are determined to be malicious code elements or untrustworthy, the system can remove, modify, or otherwise disable them. For the code elements that are determined to be non-malicious or trustworthy, the system will keep these elements in the content so that a user can access the associated functionalities. For example, if certain macros included in an incoming file are determined to be trustworthy during the authentication process, then these macros will remain in the file or be added to a modified file for user access. A user can thus access and interact with the file content in a more productive manner using the full functionalities of those macros. Type 3 systems, therefore, provide improved malicious code protection solutions that maintain a high level of productivity.

Figure 4:
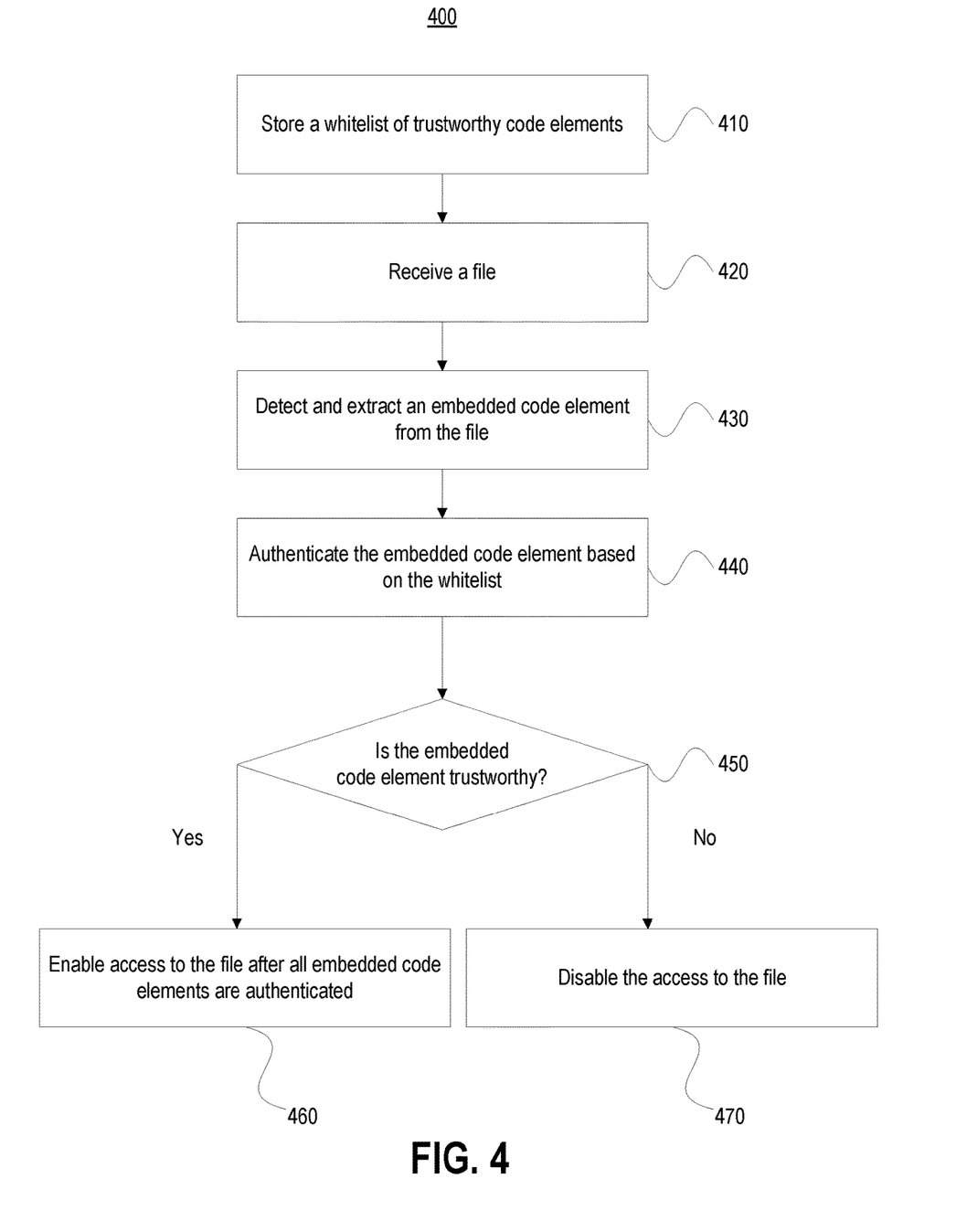
FIG. 4 is a flowchart of an example process for protecting against malicious code elements, according to some embodiments of the present disclosure.

FIG. 4 is a flowchart of an example process 400 for protecting against malicious code elements, according to some embodiments of the present disclosure. Process 400 may be implemented to detect and authenticate code elements embedded in an input file and prevent execution of potentially malicious code elements. Process 400 can be performed as part of the security processes implemented by, for example, content disarm server 136 in computing environment 100 as shown in FIG. 1. Process 400 can be implemented as part of the computer security system of network 110 to conduct a security check for, for example, incoming content from external sources before the content is delivered to an intended recipient device within network 110.

For illustrative purposes, in the following description, process 400 is described as being performed by content disarm server 136. It is appreciated, however, that one or more steps of process 400 can alternatively be performed by other components of computing environment 100, such as host computers 120, proxy server 130, e-mail server 132, file server 134, or cloud server 165. It may be integrated as a software function module installed in one or more computer system components, the implementation of which is not limited herein.

As shown in FIG. 4, process 400 includes steps 410-470. In step 410, content disarm server 136 stores a whitelist of trustworthy code elements. The whitelist of trustworthy code elements can include a set of code elements that can be embedded in electronic documents to carry a string of designated commands and actions allowed or trusted by the security system. As an example, a whitelist can include a set of macros that can be embedded in Microsoft® Office documents. As another example, a whitelist can include a set of JavaScript or ECMAScript code elements attached to a PDF file. That set of code elements can be determined as safe or trustworthy, for example, as digitally signed by a trusted publisher, source, or authority. JavaScript can be used to implement objects, methods and properties that enable a user to modify and manipulate PDF files. JavaScript code elements can be associated with various automated operations and capabilities, and can be tied to the whole file, a section such as a page or field, a button, or a certain user action. For a user processing PDF files, authenticating JavaScript code elements embedded in PDF files can be an effective way to detect and prevent malicious code elements while retaining trustworthy code elements. It is appreciated that the whitelist may include other code elements, and the composition of the whitelist may vary depending on the particular implementation environment.

In some embodiments, the whitelist can be compiled and maintained by the IT department of an enterprise as part of a malicious code protection system. To reduce the impact on productivity that can be caused by removing embedded code elements, the whitelist includes a set of trustworthy code elements that are deemed harmless and therefore can be assessed by a recipient device within the enterprise's network environment. In some embodiments, the same whitelist can apply to all recipient devices or accounts within the enterprise in a non-discriminatory manner. Alternatively, a whitelist can be device or account specific, where some devices or accounts may be associated with a more expansive whitelist including additional or different code elements than others.

In step 420, content disarm server 136 receives a file. The received file may be in different formats, such as e-mail, PDF, video, audio, image, Word document, Excel sheet or others, which are not limited herein. It is appreciated that the file may be received or accessed by any means known in the art, such as by importing locally via an external storage device, downloading or otherwise receiving from a remote web server, file server, or content server, for example, or by receiving via e-mail or any other means for accessing or receiving a file or file-like content. The file can include any input content received from a source external to network 110 or can be received or accessed by an internal system component within network 110.

The file may be transmitted by other system components to content disarm server 136 for security checks before delivering to an intended recipient device or rendered for viewing or operating. For example, the file may be content received or accessed by, or intended for, any computing elements in computing environment 100, including host computers 120, proxy server 130, e-mail server 132, file server 134, or cloud server 165. In some embodiments, files intended for other components may be transmitted to proxy server 130, e-mail server 132, or firewall 140 that serve as an intermediary computing system. The received file content can be shared with or transmitted to content disarm server 136 for performing security checks.

In some embodiments, content disarm server 136 may apply one or more rules to preprocess the received file and conduct a preliminary analysis. For example, the preliminary analysis of an input file may include determining the source of the file, the file type, file structure, the process accessing the file, or any other characteristics associated with the input file that may facilitate a determination as to whether the file includes malicious or non-malicious code elements. The preliminary analysis may be useful to first screen an input file for content or characteristics known or suspected to be associated with certain embedded content.

In step 430, content disarm server 136 detects and extracts an embedded code element from the file. For example, after receiving the file, content disarm server 136 may parse the file content and segment it into different code elements or sections of code. As part of operations at step 430, content disarm server 136 can read, scan, or parse the data units of the file content to identify any active content that may be embedded therein. In some embodiments, the active content and its location and format within the received file may be identified based on the file structure or other data associated with file. In some embodiments, as part of step 430, content disarm server 136 may be configured to identify particular types of active content, particular instructions or routines within the active content, or active content meeting predetermined characteristics.

In some embodiments, content disarm server 136 can perform the reading, scanning, or parsing process without invoking an execution engine such as a corresponding application software for rendering the file. Alternatively, content disarm server 136 may perform the processing in an isolated environment if rendering may be required. That way, the processing does not trigger execution of malicious active content that may affect the rest of the network environment. Further, the file may include one or more file components or objects, etc. In such cases, each distinct file, object, or content of the received file may be parsed one-by-one in separate iterative processes to identify any active content.

Various known code extraction tools can be used, the implementation of which is not limited herein. In some embodiments, selection of the code detection and extraction tools may be based on a result of the preliminary analysis described above with reference to step 420, such as the file structure, file type, and common code elements associated with the determined file type. For example, when the received file includes a spreadsheet or word processing document, content disarm server 136 may be configured to identify particular macros, subroutines, or other scripted functions included in the file content. For example, code extraction tools such as Mraptor can be used to detect macros using generic heuristics. Olevba is a script to parse OLE and OpenXML files to detect VBA Macros and extract their source code in clear text. Other tools can also be used, such as Microsoft OfficeMal Scanner or Oledump, both designed to locate and extract embedded VBA macro codes. As another example, a Python tool PEEPDF can be used to extract JavaScript code or other objects that may contain active code, by decoding PDF streams that are marked as JS or as another selectable object.

In step 440, content disarm server 136 authenticates the embedded code element based on the whitelist. The authentication process can be performed by a matching process, where the extracted code element is compared with one or more of the trustworthy code elements included in the whitelist to determine whether a match exists. The comparison can be done, for example, based on code signatures or basic code structural units, such as using line-by-line, section-by-section, symbol-by-symbol, or word-by-word comparison. For example, tools like Code Compare can be used to compare codes and can support several programming languages such as Java, Delphi, PHP, etc. Such code comparison tools can be used to detect structural differences, similarities, and how certain code blocks are moved or manipulated. Behavior-based techniques can also be used. For example, the embedded code element can be extracted and executed in a sandbox testing environment, isolated from the rest of the system. The behaviors of the embedded code element can be compared with behaviors of trustworthy code elements included in the whitelists, to determine whether a match exists.

Content disarm server 136 may support different levels of security scrutiny by setting comparison parameters. For example, word-by-word structural comparison can ensure a high level of scrutiny and ensure that an embedded code element only passes the security check if there is a perfect match. In some embodiments, as further described below with reference to FIG. 6, a comparison algorithm can be implemented to calculate a similarity score between the embedded code element and one or more of the trustworthy code elements in the whitelist. The similarity score can be compared against a preset threshold to determine whether the embedded code element matches a code element in the whitelist and is thus considered trustworthy. The threshold can be adjusted to correspond with different levels of scrutiny.

In step 450, content disarm server 136 determines whether the embedded code element is trustworthy, based on the authentication result. For example, if the embedded code element is determined to match a trustworthy code element in the whitelist, the embedded code element can be considered trustworthy. In that case, process 400 proceeds to step 460.

In step 460, content disarm server 136 enables access to the file after all embedded code elements are authenticated. For example, if additional embedded elements are detected and extracted from the file, content disarm server 136 may proceed to authenticate other embedded elements before enabling access to the file. Access to the file can be enabled only after all embedded code elements are authenticated and all malicious code elements are removed. In addition, before step 460, other security measures can be performed such as authenticating the source of the file or converting file formats.

If the embedded code element does not match any trustworthy code element in the whitelist, in step 450, the embedded code element can be determined to be untrustworthy and process 400 proceeds to step 470. In step 470, content disarm server 136 disables access to the file. Disabling can be implemented in different manners. For example, disabling can be performed by continuing to withhold access to the file, such as delaying delivering the file content to an intended recipient. Alternatively, disabling can be performed by blocking access to the original file, such as quarantining the file in an isolated environment, or destroying the received file. In those cases, a modified file can be created by reconfiguring passive content of the originally received file for user access, after removing all potentially malicious code elements.

Figure 5:
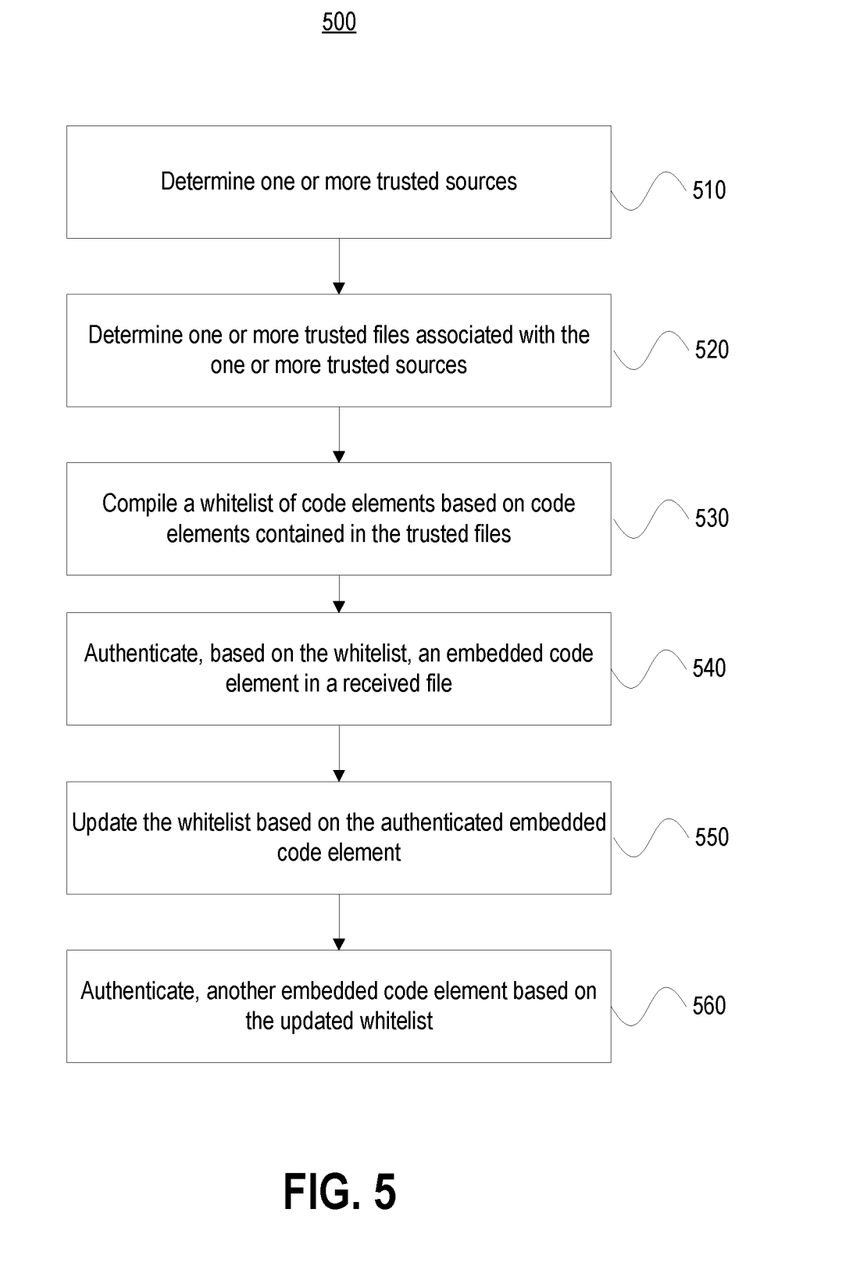
FIG. 5 is a flowchart of an example process for maintaining a whitelist of trustworthy code elements, according to some embodiments of the present disclosure.

FIG. 5 is a flowchart of an example process 500 for maintaining a whitelist of trustworthy code elements, according to some embodiments of the present disclosure. Process 500 can be performed by, for example, content disarm server 136. For example, process 500 can be integrated into a malicious code protection system implemented in content disarm server 136, in combination with process 400. With process 500, content disarm server 136 can maintain and update a whitelist of trustworthy code elements and use the updated whitelist to authenticate embedded code elements in input content. It is appreciated that one or more steps of process 500 can also be performed by other components of computing environment 100, such as host computers 120, proxy server 130, e-mail server 132, file server 134, or cloud server 165. It may be integrated as a software function module installed in one or more computer system components, the implementation of which is not limited herein. As shown in FIG. 5, process 500 includes steps 510-560.

In step 510, content disarm server 136 determines one or more trusted sources. The trusted sources can be a list of trustworthy sources designated by a computer security system. The trusted sources can include certain internal file sources or external input sources, such as those approved by one or more recipient devices.

In step 520, content disarm server 136 determines one or more trusted files associated with the one or more trusted sources. For example, with a list of trusted sources, content disarm server 136 may compile a pool of files that are received from or generated by the trusted sources. In some embodiments, content disarm server 136 or another system component may perform security checks to confirm the trustworthiness of these files before further processing.

In step 530, content disarm server 136 compiles a whitelist of code elements based on code elements contained in the trusted files. Various code extraction techniques can be used, depending on the type of code elements, the format and version of the files, and the programming language used to program the codes. In some embodiments, code extraction techniques similar to those described above with reference to step 430 can be used. For VBA codes embedded in Excel, for example, code extraction tools like Olevba, OfficeMalScanner, or others can be used, the implementation of which is not limited herein.

In step 540, content disarm server 136 authenticates, based on the whitelist, an embedded code element in a received file. As described with reference FIG. 4, content disarm server 136 can authenticate an embedded code element extracted from an input file, by comparing the extracted code element against the whitelist. Similar processing can be performed here, the detailed description is not repeated herein. For example, if a macro is extracted from an input Excel file, the extracted macro can be compared with macros included in the whitelist to determine whether the extracted macro matches one of the trustworthy macros included in the whitelist.

In step 550, content disarm server 136 updates the whitelist based on the authenticated embedded code element. For example, in step 540, if content disarm server 136 determines the extracted embedded code element matches one of the trustworthy code elements in the whitelist, the whitelist can be updated to incorporate the newly authenticated code element. The newly authenticated code element may be a newer version of an existing code element in the whitelist, or a similar code that performs similar functions. Although in clear text, the newly authenticated code element may not be identical to the matching code in the whitelist, the newly authenticated code element is a trustworthy variation and is therefore also non-malicious. The newly authenticated code element can therefore be added to the whitelist for future authentication purposes. In some embodiments, the newly authenticated code element can alternatively be used to replace the existing code element in the whitelist.

Taking macros as an example, one variation or update to such a macro embedded in an Excel document might be the addition of one or more cells, where the macro is to be operating on the additional cells. If the previous macro is included in the whitelist, then the newly authenticated macro with the addition of cells can be determined to be non-malicious.

This new macro can be added to the whitelist and/or replaces the earlier version of the macro that was on the whitelist. In some embodiments, a lookalike learning algorithm can be applied to new macros to determine whether they match existing macros in the whitelist.

For example, the whitelist may include a macro used in Excel for summing the values in a number of cells, such as Range("A1", "A200"). The SUM function is a commonly used macro that can efficiently calculate an aggregated value of certain Excel input data. An input file may include a similar SUM function macro, but for Range("A1", "A210"). As another example, the whitelist may include a copy-paste macro such as "Copy and Paste Column Range("D:D"). Copy Range("E:E")." Similar copy-paste macros may be included in an input file, but associated with different target ranges. The authentication process may determine that the newly authenticated macro matches the existing macro in the whitelist, as the remaining structure of the two macros is substantially similar. Both macros are meant to perform a non-malicious SUM or copy-paste function. The newly authenticated macro can therefore be determined to match the corresponding existing macro and can be added to the whitelist or be used to replace the existing macro in the whitelist.

In step 560, content disarm server 136 authenticates another embedded code element based on the updated whitelist. Content disarm server 136 can use the updated whitelist for subsequent authentication. Maintaining the whitelist can further include incorporating additional code elements based on an updated list of trusted files, or by adding additional code elements that are determined to be trustworthy. By maintaining an updated whitelist, security checks by content disarm server 136 can be more efficient while ensuring that all trustworthy code elements can be identified.

In cases where the whitelists of trustworthy code elements are maintained and updated, the composition of the whitelists may change over time. That may affect the level of trustworthiness of the code elements contained therein. For example, the longer a code element is included in the whitelist may indicate that the code element is more trustworthy, compared to a code element that is recently authenticated and added to the whitelist. For example, a code element that has been in the whitelist for 60 days is more trustworthy than a code element that has been in the whitelist for just 30 days; a code element that is included in the originally compiled whitelist may have a higher level of trustworthiness that those later added. In some embodiments, each code element included in the whitelist may be assigned a trustworthiness score. The trustworthiness score can correspond to a storage period of the corresponding code element. In some embodiments, the trustworthiness score can also be based on factors such as the trustworthiness of the file from which the code element is extracted.

In some embodiments, the composition of a whitelist in an actual implementation may be adjusted based on the trustworthiness score of the code elements it contains. For example, code elements included in an original whitelist may all have a trustworthiness score meeting a preset trustworthiness threshold. Depending on the security requirements of the system, a sub-whitelist can be created by adjusting the trustworthiness threshold to a higher value, so that the sub-whitelist can include only code elements with a trustworthiness score meeting the higher threshold. That in turn, can achieve a higher level of security scrutiny in the authentication process. Code elements extracted from incoming content must match the code elements in the sub-whitelist in order to be considered trustworthy. This way, the security system can accommodate different levels of security that may be required in an actual application.

Figure 6:
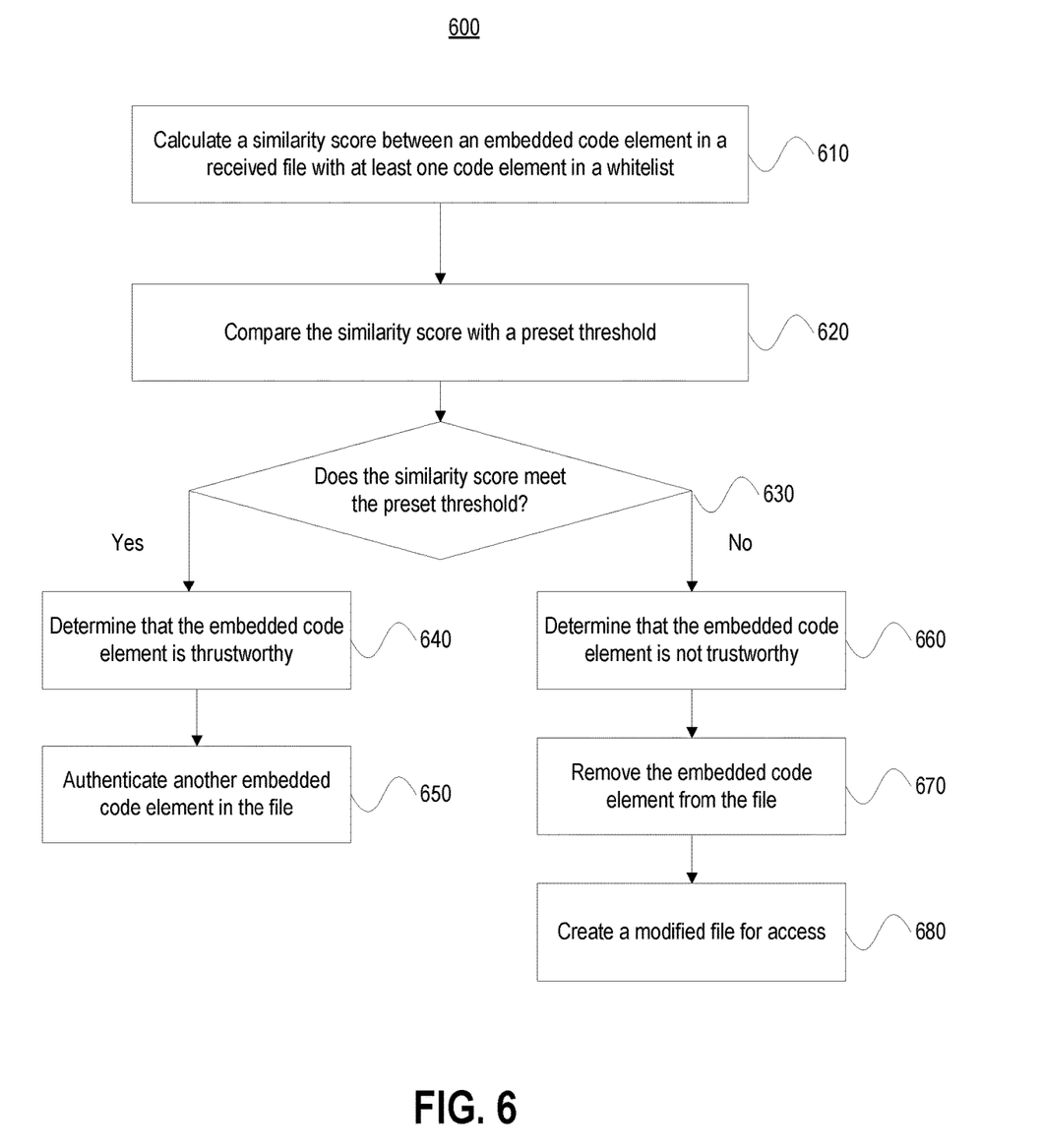
FIG. 6 is a flow chart of an example process for authenticating code elements, according to some embodiments of the present disclosure.

FIG. 6 is a flow chart of an example process 600 for authenticating code elements, according to some embodiments of the present disclosure. In some embodiments, process 600 can be integrated into the authentication process as described above with reference to process 400, such as part of the processing performed in steps 440-470. Process 600 can be performed by, for example, content disarm server 136. It is appreciated that one or more steps of process 600 can be similarly performed by other system components, as part of the computer security mechanism. As shown in FIG. 6, process 600 includes steps 610-680.

After an embedded code element is extracted from an input file (e.g., in step 430), in step 610, content disarm server 136 can calculate a similarity score between the embedded code element in a received file with at least one code element in a whitelist. For example, this can be based on clear text of the codes through word-by-word comparison, or section-by-section (such as line-by-line, or symbol-by-symbol) comparison combined with an aggregation of the section-by-section comparison results. In some embodiments, the comparison can be based on only certain fragments of the codes, such as the declarative header section or body section in HTML codes, or the main method definition section of Java scripts. Various existing tools of code comparison can be used. Text-based approaches, as described above, perform similarity checking by comparing the textual composition of the code elements. The code elements can further be transformed into tokens, which are an abstract representation of the codes. Comparison can be based on the transformed tokens. Other comparison techniques can similarly be used, such as tree-based or graph-based similarity measurement. The code similarity measurement results can be converted to or reflected in a similarity score on a defined scale for subsequently assessments.

In some embodiments, in the code comparison and similarity measurement process, content disarm server 136 can use various code similarity algorithms, also known as software plagiarism detection algorithms. These algorithms can be used to detect similar code elements, or detect whether two code elements have the same root. Other techniques include winnowing algorithms for selecting fingerprints from hashes of k-grams, Karp-Rabin string matching, all-to-all matching (comparing all pairs of k-grams), etc. In addition, many off-the-shelf tools are available and can be used in the code elements comparison process. For example, organizations like Codequiry offer plagiarism detection tools that can be used in various applications for code comparison. It is appreciated that other code comparison or similarity detection tools can also be implemented in step 610, which is not limited herein.

In step 620, content disarm server 136 compares the similarity score with a preset threshold. The threshold can be associated with an adjustable value to accommodate different levels of security requirements. A plurality of similarity scores can be compared with the preset threshold, each similarity score corresponding to comparison with a code element in the whitelist. In such cases, each of the similarities scores can be compared against the preset threshold. Alternatively, content disarm sever 136 can select the highest similarity score to compare with the preset threshold, to improve efficiency of the comparison process.

In step 630, content disarm server 136 determines whether the similarity score meets the preset threshold. If the similarity score meets (higher than or equal to) the preset threshold, process 600 proceeds to step 640. That is, the embedded code element extracted from the input file can be considered to match the corresponding trustworthy code element in the whitelist, and is therefore non-malicious. In step 640, content disarm server 136 determines that the embedded code element is trustworthy.

In step 650, content disarm server 136 proceeds to authenticate another embedded code element in the file. As described above with reference to step 460 in process 400, access to the file can be enabled only after all embedded code elements are authenticated and all malicious code elements removed. Other security checks may be performed, the implementation of which is not limited herein.

If in step 630, content disarm server 136 determines that the similarity score does not meet the preset threshold, process 600 proceeds to step 660. That is, the embedded code element extracted from the input file can be considered not matching any of the trustworthy code elements in the whitelist, and is therefore potentially malicious. In step 660, content disarm server 136 determines that the embedded code element is not trustworthy. Various security measures can be taken to ensure that the embedded code is disabled or prevented from being accessed or executed. For example, in step 670, content disarm server 136 removes the embedded code element from the file. Removal can be performed by, for example, modifying the originally extracted code element to disable the associated function, or deleting relevant code text.

In some embodiments, content disarm server 136 may quarantine the embedded code element in an isolated execution environment for further testing. In step 680, for example, content disarm server 136 creates a modified file based on the passive content of the file or based on the file content less the embedded code elements determined to be malicious. Content disarm server 136 can make the modified file accessible to the user, or alternatively, continue to perform other security checks before making it accessible.

Figure 7:
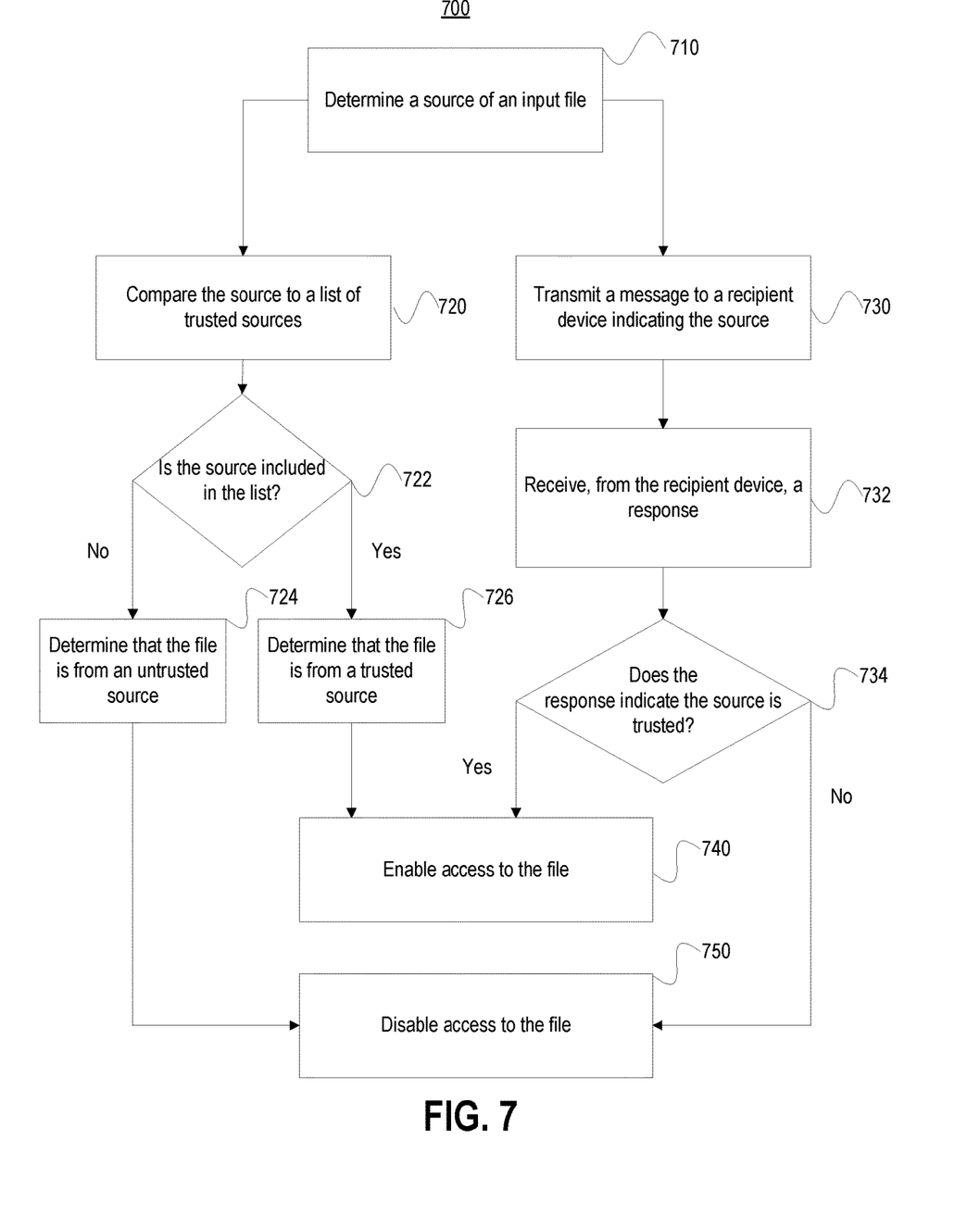
FIG. 7 is a flow chart of an example process for authenticating a file source, according to some embodiments of the present disclosure

FIG. 7 is a flow chart of an example process 700 for authenticating a file source, according to some embodiments of the present disclosure. In some embodiments, the code detection and authentication process can be further combined with file source authentication. For example, content disarm server 136 can determine whether the source of an input file is trustworthy before delivering the file content to an intended recipient device. It is appreciated that one or more steps of the file source authentication process can be performed by one or more components other than content disarm server 136. As shown in FIG. 7, process 700 includes steps 710-750.

In step 710, content disarm server 136 determines a source of an input file. The input file can be in any format and content disarm server 136 can function as the first or intermediary receiving server for all incoming content into the system (such as content input from external networks into network 110) before the content is delivered to devices within the system. Determination of the file source may depend on the format of the input file. For example, the input file can be an e-mail from an external source. Content disarm server 136 can determine the source of the e-mail message by locating the IP address of the sender's e-mail server. In some embodiments, content disarm server 136 may determine a user account associated with the incoming e-mail and use the user account as the file source. In cases where the input file is downloaded from an internet source, content disarm server 136 may check the file's metadata, or trace the file based on its digital signature. For example, some downloaded content includes in property information, URLs of origin sites, etc. As another example, file sources can also be determined based on a source application (e.g., HR submission form), or an authenticated client name (for example, a user may allow others to send files via a web application, and the user can name the senders after authentication).

In step 720, content disarm server 136 compares the source to a list of trusted sources. The trusted sources can be a pre-stored list of sources that have been verified to be trustworthy. The list can be applied across the network system or it can be user specific. In some embodiments, the list of trusted sources may be updated, adding additional trusted sources, such as through the procedures described below with reference to step 732. In those cases, the updated list may be used for authenticating future or other file sources.

In step 722, content disarm server 136 determines whether the file source is included in the list. If the source is listed in the list, process 700 proceeds to step 726. In step 726, content disarm server 136 determines that the file is from a trusted source. Content disarm server 136 may allow access to the file. In some embodiments, before step 740, content disarm server 136 may perform other security checks, such as determining whether the file contains embedded code elements and authenticating whether the embedded code elements are malicious. The code authentication process can include procedures similar to that described above with reference to FIG. 4.

If in step 722, content disarm server 136 determines that the file source is not included in the list of trusted sources, process 700 proceeds to step 724. In step 724, content disarm server 136 determines that the file is from an untrusted source, which may carry potential security risk. Content disarm server 136 therefore prevents the file from further distribution within the system. For example, in step 750, content disarm server 136 may disable access to the file by, for example, destroying the file or quarantining the file in an isolated environment for further analysis. Content disarm server 136 may further report the untrusted source to an administrator or prompt the source to be added to a source blacklist.

In some embodiments, the source of the input file can be compared against a list of untrusted sources, as an alternative to or in addition to the processing described above with reference to steps 720 and 722. For example, where a list of untrusted sources is used, if the source of the file matches a source in the list of untrusted sources, content disarm server 136 can determine that the file is from an untrusted source. Content disarm server 136 therefore prevents the file from further distribution. For example, process 700 can proceed to step 750 and disable access to the file, performing processing similar to that described above. On the other hand, if the source of the file does not match any source included in the list of untrusted sources, content disarm server 136 can determine that the file is not from an untrusted source. In that case, content disarm server 136 may proceed to step 740 and enable access to the file.

In some embodiments, the file source authentication process can alternatively or additionally be performed based on assessment and responses from one or more recipient devices. For example, after content disarm server 136 determines the source of the input file in step 710, process 700 can proceed to step 730. In step 730, content disarm server 136 creates an inquiry message indicating the determined source, and transmit the message to a recipient device. The recipient device can be an intended recipient device such as a host computer 120 within network 110, or a security check device associated with content disarm server 136. For example, content disarm server 136 may include or be communicatively connected to a file source verification device of network 110. The file source verification device, after receiving the message, can verify whether the source is a trusted source.

In step 732, content disarm server 136 receives, from the recipient device, a response. The response may indicate whether the source is a trusted source. The response may include further instructions, such as adding the source to a trusted source list or a blacklist. In step 734, content disarm server 136 can parse the received response to determine whether the response indicates the source is a trusted source. If in step 734, content disarm server 136 determines that the source is a trusted source, process 700 proceeds to step 740. In step 740, content disarm server 136 enables access to the file. Other security checking processes may be performed before step 740, such as code element detection and authentication as described above with reference to FIG. 4, which are not limited herein.

If in step 734, content disarm server determines that the response indicates the source is not trusted, process 700 proceeds to step 750. In step 750, as described above, content disarm server 136 disables access to the file by, for example, destroying the file or quarantining the file in an isolated environment for further analysis. Content disarm server 136 may further report the untrusted source to an administrator or prompt the source to be added to a source blacklist. Content disarm server 136 may perform other processing based on the instructions included in the response received from the recipient device, which are not limited herein.

Based on embodiments of the present disclosure, improved malicious code protection systems are provided, which can maintain a high level of productivity while preventing potential security attacks associated with malicious code elements embedded in input content. For example, in some embodiments, a computer security system (which can include a content disarm server) can maintain a whitelist of non-malicious code elements that provide beneficial and efficient content processing functionalities. The whitelist can be compiled based on a set of trusted files associated with trusted sources. When processing an input file, the computer security system can detect and extract embedded code elements from the file, and authenticate the extracted code elements by comparing them against the whitelist. If an extracted code element matches a trustworthy code element included in the whitelist, the computer security system can determine that the extracted code element is trustworthy and can be included in the file for distribution to an intended recipient device. That way, useful and non-malicious code elements, such as certain macros or JavaScript in Excel documents can pass the security check.

The user can access the associated functionalities. Suspicious or malicious code elements, such as those not matching any trustworthy code elements in the whitelist, can be removed and disabled. Thus, a high level of security can be achieved without compromising productivity. In some embodiments, the code element authentication process can further be combined with file source authentication. For example, the computer security system can determine whether the file is from a trusted source by comparing the file source against a list of trusted sources, or receiving from a recipient device a response indicating whether the source/sender is trustworthy.

The foregoing description of exemplary embodiments has been presented for purposes of illustration. It is appreciated that the present disclosure is not limited to the precise forms or embodiments disclosed. Modifications and adaptations will be apparent to those skilled in the art from consideration of the specification and practice of the disclosed embodiments. Thus, while certain features of the example embodiments have been illustrated and described herein, many modifications, substitutions, changes, and equivalents will be derived based on the present disclosure.

The appended claims are to be interpreted broadly based on the language used in the claims and not limited to examples described in the present specification, which are non-exclusive. For example, aspects of the disclosed embodiments are described as operations performed by a computing system, and one skilled in the art will appreciate that these aspects can be configured as a set of instructions stored on and executed from many types of tangible computer-readable media, such as secondary storage devices, like hard disks, floppy disks, or CD-ROM, or other forms of RAM or ROM.

What is claimed is:

1. A method of protecting an execution environment from malicious code elements, the method comprising:
   storing a set of code elements, each code element being executable using an application;
   receiving a file;
   determining whether the file contains an embedded code element;
   in response to the file containing an embedded code element, authenticating the embedded code element based on the stored set of code elements to determine whether the embedded code element is trustworthy;
   in response to an authentication result that the embedded code element is trustworthy, enabling access to the file; and
   in response to an authentication result that the embedded code element is not trustworthy:

removing the embedded code element from the file, and creating a modified file with the embedded code element removed.

2. The method of claim 1, wherein the stored set of code elements comprises a plurality of trustworthy code elements generated from one or more trusted files.

3. The method of claim 2, wherein the one or more trusted files are associated with one or more trusted sources.

4. The method of claim 3, wherein the one or more trusted sources are approved or designated based on user input.

5. The method of claim 1, wherein the stored set of code elements includes a plurality of code elements, each code element of the stored set having a trustworthiness score meeting a trustworthiness threshold.

6. The method of claim 5, wherein the trustworthiness score for a corresponding one of the code elements is based on a storage period of the corresponding code element.

7. The method of claim 5, wherein the trustworthiness threshold is adjustable.

8. The method of claim 1, wherein the authenticating comprises:
comparing the embedded code element with at least one code element in the stored set of code elements; and
authenticating the embedded code element based on a result of the comparison.

9. The method of claim 8, further comprising:
calculating a similarity score between the embedded code element with each of the at least one code element in the stored set of code elements; and
in response to a similarity score between the embedded code element and a first code element in the stored set of code element meeting a preset threshold, determining that the embedded code element is trustworthy.

10. The method of claim 1, further comprising:
updating the stored set of code elements based on the embedded code element; and
authenticating another embedded code element based on the updated stored set of code elements.

11. The method of claim 10, wherein the updating comprises:
in response to an authentication result that the embedded code element is trustworthy, adding the embedded code element to the stored set of code elements; or
replacing a code element in the stored set of code element with the trustworthy embedded code element.

12. The method of claim 1, further comprising:
in response to an authentication result that the embedded code element is not trustworthy, disabling access to the file.

13. . The method of claim 1, further comprising:
enabling access to the modified file when the response authentication result indicates the embedded code element is not trustworthy.

14. The method of claim 1, further comprising:
determining a source of the file; and
authenticating the source of the file.

15. The method of claim 14, wherein authenticating the source of the file comprises:
transmitting the source of the file to a recipient device;
receiving an instruction from the recipient device, the instruction indicating whether the file is from a trusted source; and
controlling access to the file based on the instruction.

16. The method of claim 14, wherein authenticating the source of the file comprises:

comparing the source of the file against one or more sources in a stored list of file sources; and
authenticating the source of the file based on a result of the comparison.

17. The method of claim 16, wherein the stored list of file sources comprises a list of one or more trusted file sources, the method further comprising:
in response to the source of the file matching a source in the stored list of file sources, determining that the file is from a trusted source; and
enabling access to the file.

18. The method of claim 16, wherein the stored list of file sources comprises a list of one or more untrusted file sources, the method further comprises:
in response to the source of the file matching a source in the stored list of file sources, determining that the file is from an untrusted source; and
disabling access to the file.

19. A non-transitory computer-readable medium comprising instructions that when executed by a processor perform a method of protecting an execution environment from malicious code elements, the method comprising:
storing a set of code elements, each code element being executable using an application;
receiving a file;
determining whether the file contains an embedded code element;
in response to the file containing an embedded code element, authenticating the embedded code element based on the stored set of code elements to determine whether the embedded code element is trustworthy;
in response to an authentication result that the embedded code element is trustworthy, enabling access to the file; and
in response to an authentication result that the embedded code element is not trustworthy:
removing the embedded code element from the file;
creating a modified file with the embedded code element removed.

20. A system for protecting an execution environment from malicious code elements, the system comprising:
a memory device storing a set of instructions; and
a processor configured to execute the set of instructions to:
storing a set of code elements, each code element being executable using an application;
receiving a file;
determining whether the file contains an embedded code element;
in response to the file containing an embedded code element, authenticating the embedded code element based on the stored set of code elements to determine whether the embedded code element is trustworthy;
in response to an authentication result that the embedded code element is trustworthy, enabling access to the file; and
in response to an authentication result that the embedded code element is in response to an authentication result that the embedded code element is not trustworthy:
removing the embedded code element from the file;
creating a modified file with the embedded code element removed.

* * * * *